(12) United States Patent
Forte et al.

(10) Patent No.: US 9,600,686 B2
(45) Date of Patent: Mar. 21, 2017

(54) AUGMENTED REALITY BASED PRIVACY AND DECRYPTION

(71) Applicant: AT&T INTELLECTUAL PROPERTY I, L.P., Atlanta, GA (US)

(72) Inventors: Andrea Forte, Brooklyn, NY (US); Evgene Vahlis, Mississauga (CA)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/984,363

(22) Filed: Dec. 30, 2015

(65) Prior Publication Data

US 2016/0110560 A1 Apr. 21, 2016

Related U.S. Application Data

(63) Continuation of application No. 14/537,614, filed on Nov. 10, 2014, now Pat. No. 9,251,366, which is a continuation of application No. 13/708,641, filed on Dec. 7, 2012, now Pat. No. 8,886,942.

(51) Int. Cl.
*H04L 9/32* (2006.01)
*G06F 21/62* (2013.01)
*H04L 9/08* (2006.01)
*H04L 29/06* (2006.01)

(52) U.S. Cl.
CPC ...... *G06F 21/6227* (2013.01); *G06F 21/6209* (2013.01); *H04L 9/08* (2013.01); *H04L 9/0819* (2013.01); *H04L 9/0822* (2013.01); *H04L 63/0428* (2013.01); *H04L 63/062* (2013.01)

(58) Field of Classification Search
CPC .......................... G06F 21/6209; G06F 21/6227

USPC .......................................................... 713/171
See application file for complete search history.

(56) References Cited

U.S. PATENT DOCUMENTS

| 6,898,288 | B2* | 5/2005 | Chui | H04K 1/00 380/278 |
|---|---|---|---|---|
| 8,886,942 | B2 | 11/2014 | Forte | |
| 2004/0073796 | A1* | 4/2004 | Kang | H04L 63/06 713/171 |
| 2004/0080772 | A1* | 4/2004 | Snyders | G06F 21/608 358/1.14 |
| 2005/0246763 | A1* | 11/2005 | Corcoran | G06F 21/10 726/3 |
| 2008/0163337 | A1* | 7/2008 | Tuliani | H04L 63/0245 726/2 |
| 2009/0006851 | A1* | 1/2009 | Freeman | H04L 63/0442 713/170 |
| 2011/0078722 | A1* | 3/2011 | Wendling | H04N 7/163 725/31 |
| 2011/0291803 | A1* | 12/2011 | Bajic | G08B 13/2462 340/10.1 |
| 2013/0272523 | A1* | 10/2013 | McCorkindale | H04N 1/44 380/243 |

* cited by examiner

*Primary Examiner* — Arvin Eskandarnia

(57) ABSTRACT

A method, non-transitory computer readable medium and apparatus for decrypting a document are disclosed. For example, the method captures a tag on an encrypted document, transmits the tag to an application server of a communication network to request a per-document decryption key, receives the per-document decryption key if the tag is authenticated, and decrypts a portion of the encrypted document using a temporary decryption key contained in the tag, the tag decrypted with the per-document decryption key.

20 Claims, 4 Drawing Sheets

AUGMENTED REALITY BASED PRIVACY AND DECRYPTION

This application is a continuation of U.S. patent application Ser. No. 14/537,614, filed Nov. 10, 2014, which is currently allowed and is a continuation of U.S. patent application Ser. No. 13/708,641, filed Dec. 7, 2012, now U.S. Pat. No. 8,886,942, all of which are herein incorporated by reference in their entirety.

The present disclosure relates generally to privacy and decryption of documents and, more particularly, to a method, computer readable medium, and apparatus for providing augmented based privacy and decryption.

BACKGROUND

Certain professions require that documents be kept confidential to maintain privacy of individuals and/or such that only certain individuals having a certain clearance level will have access to certain documents. For example, it may be important in the health care industry to keep patient records confidential. A user may access a website, an electronic document or a paper-document and may want to make sure that the user is the only one able to view the information. In other words, the user may want to ensure that people in the vicinity of the user are not "spying" as the user is viewing the information. In addition, once a confidential document has been decrypted and printed, there is no guarantee that the confidential document will not end up or be read by unauthorized personnel.

SUMMARY

In one embodiment, the present disclosure provides a method, computer readable medium, and apparatus for decrypting a document. For example, the method captures a tag on an encrypted document, transmits the tag to an application server of a communication network to request a per-document decryption key, receives the per-document decryption key if the tag is authenticated, and decrypts a portion of the encrypted document using a temporary decryption key contained in the tag, the tag decrypted with the per-document decryption key.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory (i.e., tangible or physical) computer readable storage medium, and apparatus for decrypting a document. As noted above, certain professions require that documents be kept confidential to maintain privacy of individuals or such that only certain individuals having a certain clearance level will have access to certain documents. However, once a document is printed or published there is no guarantee that it will not end up or be read by unauthorized personnel unless the document is destroyed.

One embodiment of the present disclosure provides augmented reality encryption and decryption such that documents may remain encrypted and only those with appropriate access may decrypt and view the encrypted document. For example, an augmented reality device is used to capture an image, to provide a live view or feed of the encrypted document, to decrypt the image and to present the decrypted document to a user locally on a display of the augmented reality device, while the encrypted document remains encrypted.

Figure 1:
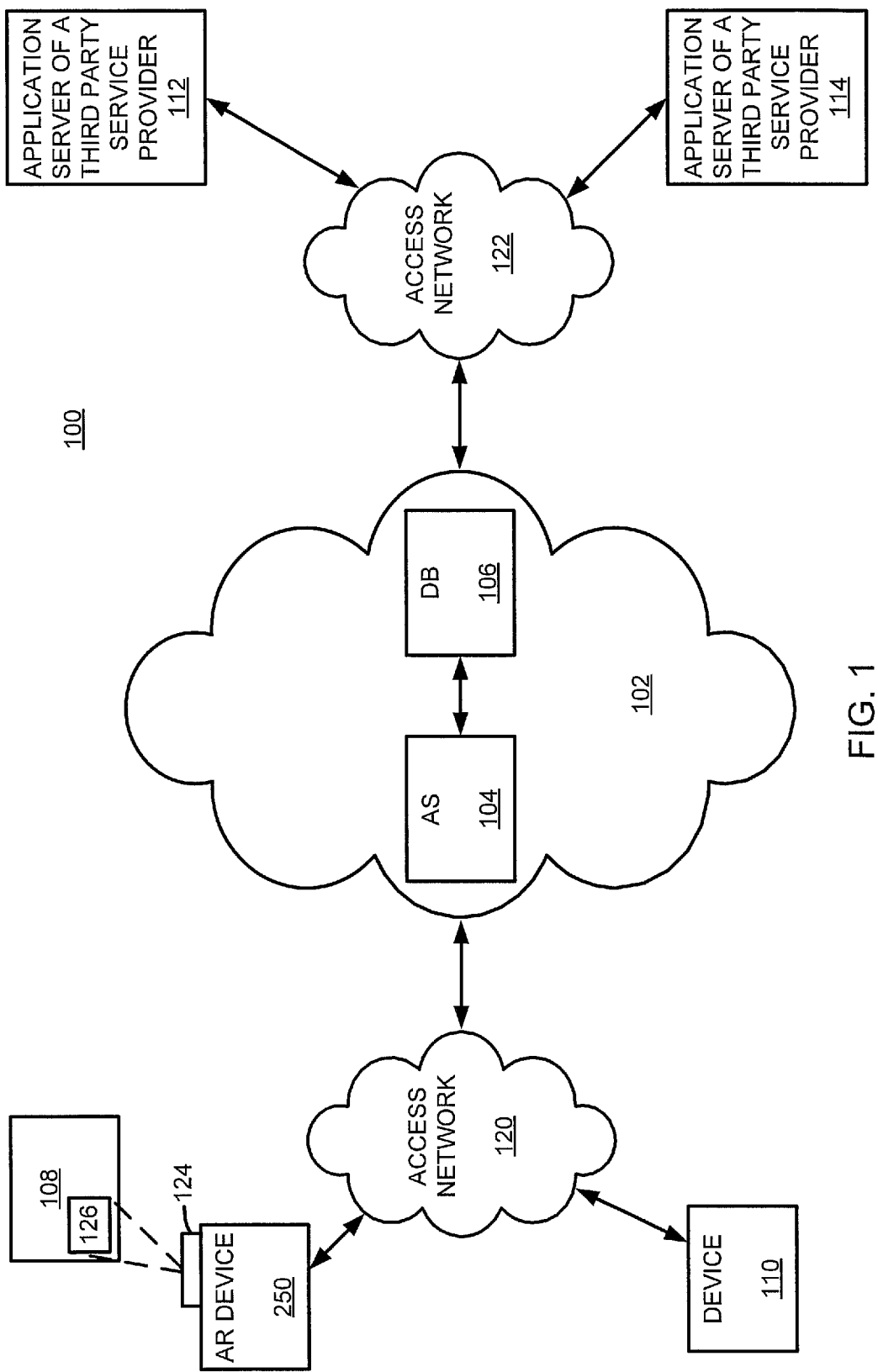
FIG. 1 illustrates one example of a communication network of the present disclosure.

FIG. 1 is a block diagram depicting one example of a communication network 100. The communication network 100 may be any type of communication network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a Wireless Fidelity (Wi-Fi) network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed.

Figure 4:
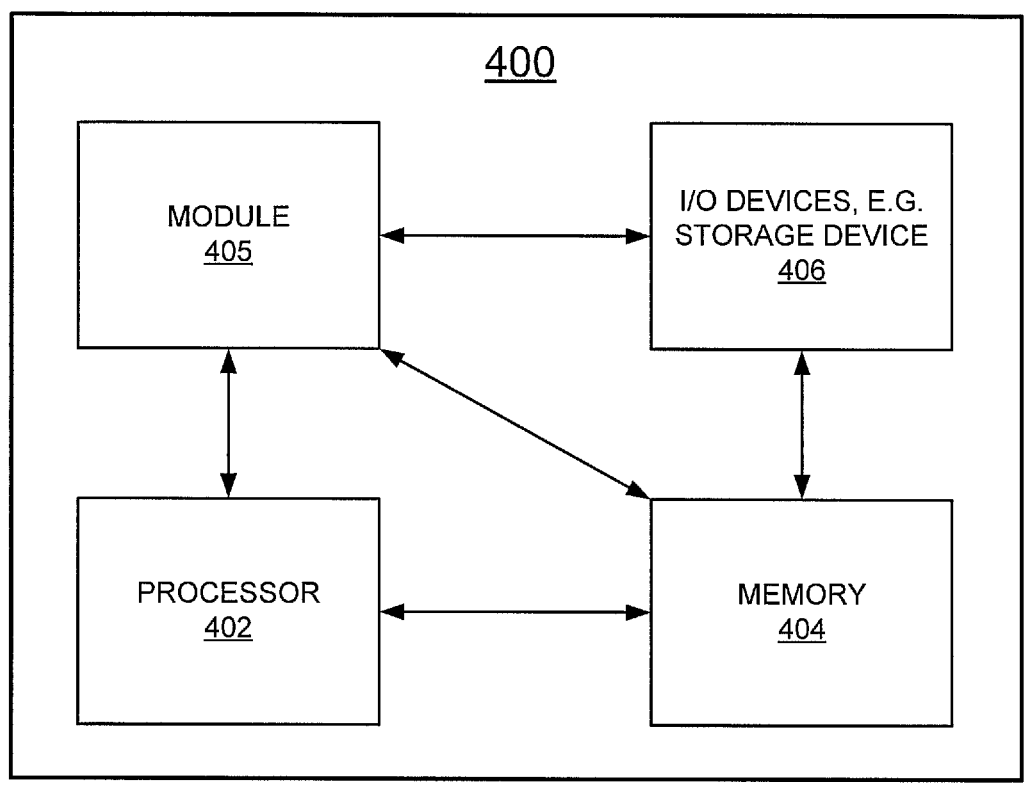
FIG. 4 illustrates a high-level block diagram of a general-purpose computer suitable for use in performing the functions described herein.

In one embodiment, the AS 104 may comprise a general purpose computer as illustrated in FIG. 4 and discussed below. In one embodiment, the DB 106 may store personal information of the subscribers of the communication network 100, such as the subscribers' user identification (uid), public and private key information, encryption and decryption keys, and the like. In embodiment, the core network 102 may be operated by a communication network service provider.

In one embodiment, the access network 120 may be in communication with one or more devices 250 and 110. In one embodiment, the one or more devices 250 and 110 may be augmented reality (AR) decryption devices with each device having an image capturing device 124. In one embodiment, the image capture device 124 may be used to capture at least a portion 126 of a document, e.g., displayed by a display device 108, e.g., a screen, a monitor and the like.

In one embodiment, the device 108 may be any device having a display capable of displaying an image or printing a document. For example, the device 108 may be a mobile device, a laptop, a tablet computer, a desktop computer, a printer, a scanner, a copying machine, and the like. The document may be an electronic document (e.g., a web page on a computer monitor, an electronic email, a word processing document, a spreadsheet, and the like) displayed by the device 108 or a physical document (e.g., a printed document on paper) produced or printed by the device 108.

In one embodiment, the AR device 250 may be a mobile endpoint device having a camera and a display. In another embodiment, the AR device 250 may be implemented as a pair of augmented reality glasses having a display and a camera with wireless capabilities to communicate with the communication network 100.

In yet another embodiment, the AR device 250 may be a combination of devices. For example, a mobile endpoint device having a camera or video camera may be in communication with a pair of augmented reality decryption glasses if the glasses do not have an image capture device.

In one embodiment, the access network 122 may be in communication with one or more third party service providers 112 and 114. For example, the third party service providers 112 and 114 may include service providers such as, for example, a financial institution, e.g., a bank, a health care provider, e.g., a doctor, a hospital, a medical laboratory, and the like. In one embodiment, the third party service providers 112 and 114 may need to provide documents, either physically or electronically, that are considered to be sensitive or confidential to a user.

It should be noted that the network 100 has been simplified. For example, the network 100 may include other network elements (not shown) such as border elements, routers, switches, policy servers, security devices, gateways, a content distribution network (CDN) and the like.

Figure 2:
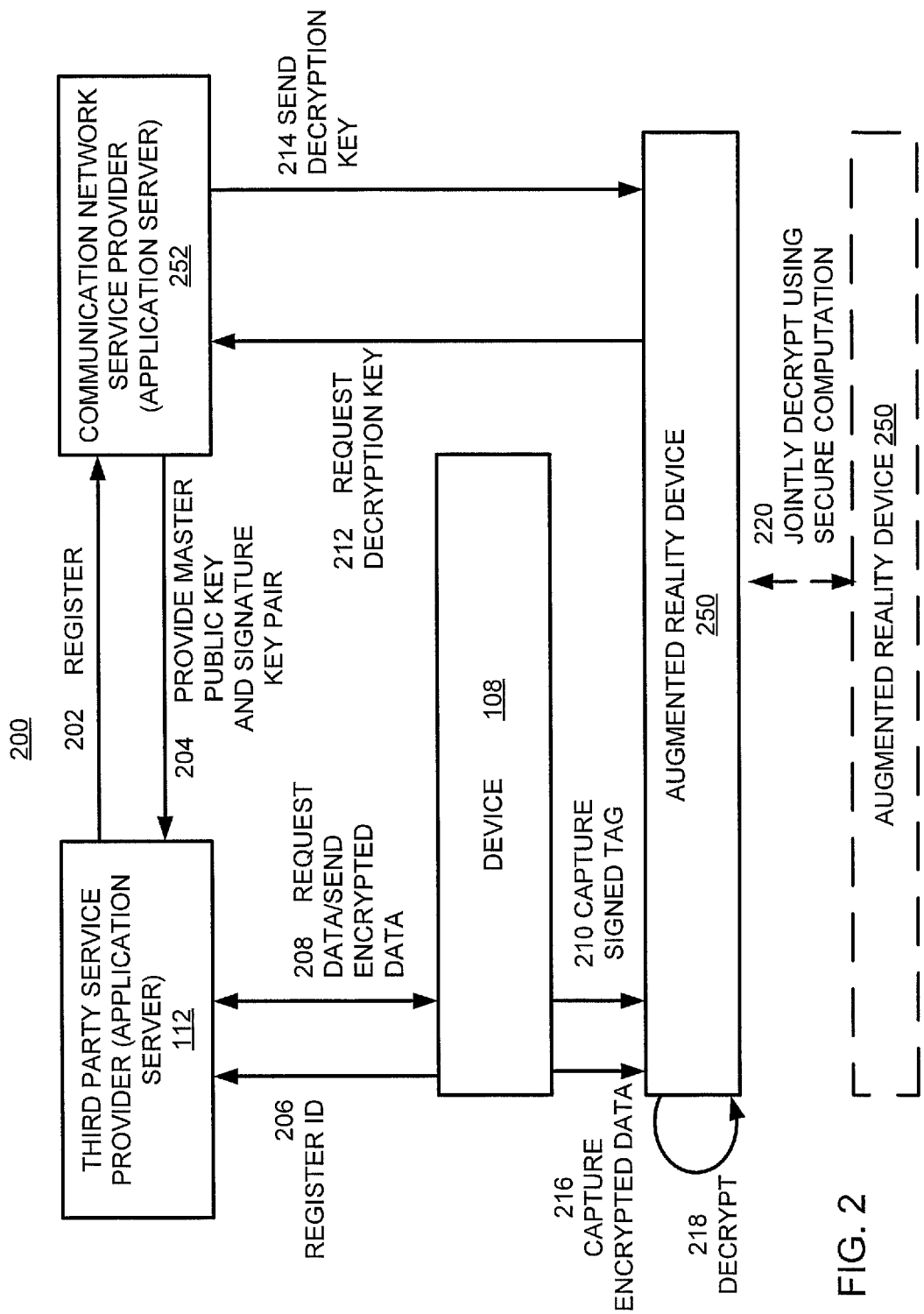
FIG. 2 illustrates an example flowchart of one embodiment of a method for decrypting a document.

FIG. 2 illustrates an example flowchart of one embodiment of a method 200 for decrypting a document. In one embodiment, the method 200 may be performed by the AR device 250 in communication with the communication network 102 and the third party service provider 112. In one embodiment, the steps, functions, or operations of method 200 may be performed by a computing device 400 as described in connection with FIG. 4 below.

The method 200 begins at step 202. At step 202, the third party service provider 112 may register with an application server (or any hardware equivalents or systems) of the communication network service provider 252 of a communication network. For example, the third party service provider 112 may be a bank and the communication network service provider 252 may be a cellular communication service provider that provides mobile communication services to subscribers and/or operates the core network 102.

At step 204, the application server (e.g., AS 104) of the communication network service provider 252 may generate a master key pair including a master public key and a master private key and a signature key pair including a public signature key and a private signature key. The communication network service provider 252 provides a master public key and the signature key pair to the third party service provider 112. The communication network service provider 252 may keep the master private key and a copy of the public signature key.

In one embodiment, the master key pair is generated only once. In one embodiment, the signature key pair may be generated for each one of a plurality of different third party service providers (e.g., third party service providers 112 and 114). In other words, the signature key pair may be generated multiple times. The master public key may be a key that is used to encrypt a temporary key or a short term key that is generated randomly by the third party service provider 112. The temporary key or the short term key may be used to encrypt a document (e.g., either physical or electronic) that will be accessed by a user.

The signature key pair may be used to identify that the document was from a legitimate third party service provider, e.g., the third party service provider 112. For example, the private signature key may be used by the third party service provider 112 to generate a signature for a tag and the public signature key may be used by the communication network service provider 252 to verify that the signature is from the correct or legitimate third party service provider.

At step 206, a user of the device 108 may register his or her identification (ID) with an application server of the third party service provider 112. In one embodiment, the ID may be a user ID associated with the user's subscription to a communication service provided by the communication network service provider 252. In one embodiment, the user is a subscriber of the communication network service provider 252 and the third party service provider 112. For example, the user may have a bank account with the third party service provider 112 and is a mobile subscriber of the communication network service provider 252.

At step 208, the device 108 may request data and the third party service provider 112 may send encrypted data to the device 108 in response to the request. For example, the third party service provider 112 may receive a request for a confidential or sensitive document, e.g., a bank account statement from the device 108. In response, the third party service provider 112 may send an encrypted bank statement to the device 108.

In one embodiment, the third party service provider 112 may have an authentication process to ensure that the user requesting the data via the device 108 is authorized to receive the data. For example, if the third party service provider 112 is a bank, the user may log in with a username and password for the user's bank account with the bank to access various bank documents or statements. The data sent to the device 108 may be encrypted and sent with a signed tag from the third party service provider 112.

In one embodiment, the document may be visually encoded by dividing the image or video frame of the encrypted document into blocks. In one embodiment, taking into account color and light balance, the image of the document should be encoded using a gray scale or colors with enough separation between the gray scales or colors so that instead of trying to identify the actual color (e.g., blue vs. yellow), the device would be able to distinguish between different gray scales or colors (i.e., color 1 vs. color 2). Although one example was provided above, any visual encoding algorithm may be used. Each block may then be individually encrypted using an advanced encryption standard (AES). In one embodiment, the encryption may be performed using a random nonce.

In one embodiment, the encryption may be performed by using an n×m matrix of the blocks. For example, a per-document key Kdoc can be used to encrypt the matrix block by block. The per-document key may be for example, the temporary key or the short term key described above. The per-document key may be encrypted using the master public key. In one embodiment, the cell i and column j may be encrypted according to a function $C_{i,j}=[i, j, F_{Kdoc}(i, j) \oplus M_{i,j}]$, where F is a block cipher, such as AES. The above encryption method may use less memory and be more efficient than other currently used methods of encryption.

In one embodiment, the tag may be signed by a signature of the service provider that is generated with the private signature key, the ID of the user and a time stamp. In one embodiment, the time stamp may be used to enable "self destruction" of a document. For example, the encrypted data may only be available for decryption for a predefined time period, e.g., a 48 hour window, a window of one week, and so on. As an example, if the user does not decrypt the encrypted document within 48 hours, no decryption key will be available or issued after the 48 hour time period and the document may never be decrypted. The time window used above is only one example and it should be noted that any time window may be used.

At step 210, the AR device 250 may visually capture the signed tag via an image capturing device, e.g., a camera. At step 212, the AR device 250 may send a request for a per-document decryption key to the communication network service provider 252 with the signed tag. In one embodiment, the communication network service provider 252 may perform an authentication of the AR device 250. For example, to ensure that a user is not trying to decrypt a document that belongs to another individual (e.g., a user reading over the shoulder of another user), the communication network service provider may verify that the ID of the user matches an ID of the AR device 250 or use a login and password that is associated with both the AR device 250 and the ID of the user.

If authentication of the AR device 250 is required and the AR device 250 is authenticated, the communication network service provider 252 may use the stored public signature key to ensure that the signature from the signed tag is from a legitimate third party service provider, e.g., the third party service provider 112. If so, the communication network service provider 252 may use the stored master private key to generate a per-document decryption key that can be used to decrypt the tag containing a temporary decryption key to decrypt the encrypted document.

The application server of the communication network service provider 252 may also verify that the ID of the user is a subscriber of the communication network service provider 252 and that the request was received within the available time window, e.g., 48 hours based upon comparing the time stamp of the encrypted data and a current time or a time the request was received from the device 108. If the communication network service provider 252 verifies that the signature, the ID of the user and the time stamp are correct, the communication network service provider 252 may send the per-document decryption key to the AR device 250.

At step 214, the communication network service provider 252 sends the per-document decryption key to the AR device 250. The AR device 250 may then locally decrypt the tag with the per-document decryption key to obtain the temporary decryption key contained in the tag to decrypt the encrypted document. Any available decryption algorithm may be used to decrypt the encrypted data to decrypt subsets of an entire document. For example, a 10 inch by 10 inch document may be segmented such that any 2 inch by 2 inch block within the 10 inch by 10 inch document may be decrypted and presented on a 2 inch by 2 inch display of the device 250. It should be noted that the dimensions above are provided only as examples and that any sized document may be segmented into any smaller sized documents appropriate for display on any sized display of the device 250.

To illustrate, the AR device 250 may have an image capturing device 124 to capture at least a portion of the encrypted data, e.g., an electronic document displayed by the device 108. Using the temporary decryption key contained in the tag, the AR device 250 may decrypt the portion of the encrypted data that is captured by the image capturing device 124 and display it on a display of the AR device 250. As a result, only a user viewing the display of the AR device 250 (e.g., placing the AR device over the device 108) may read a decrypted version of the encrypted data. Notably, the entire decrypted version of the encrypted data would not be displayed, but only a subset of the decrypted version of the encrypted data. In addition, it should be noted that the encrypted data remains encrypted on the document as displayed on device 108, either physical or electronic, during decryption.

At step 216, the AR device 250 may "read" or capture the encrypted data from the device 108. For example, the AR device 250 may use an image capturing device, e.g., a video camera or motion video recorder, to read or capture the encrypted data.

At step 218, the AR device 250 may then perform the decryption using the temporary decryption key obtained from the tag.

In one embodiment, the method 200 may perform optional step 220. The optional step 220 may be performed if the AR device 250 comprises multiple devices that are working together as a single AR device 250, e.g., augmented reality glasses and a mobile endpoint device, as illustrated by the AR device 250 in the dashed lines. If the AR device 250 comprises multiple devices, at optional step 216, the multiple AR devices 250 may jointly decrypt the encrypted data using a secure computation. The method 200 may then end.

Figure 3:
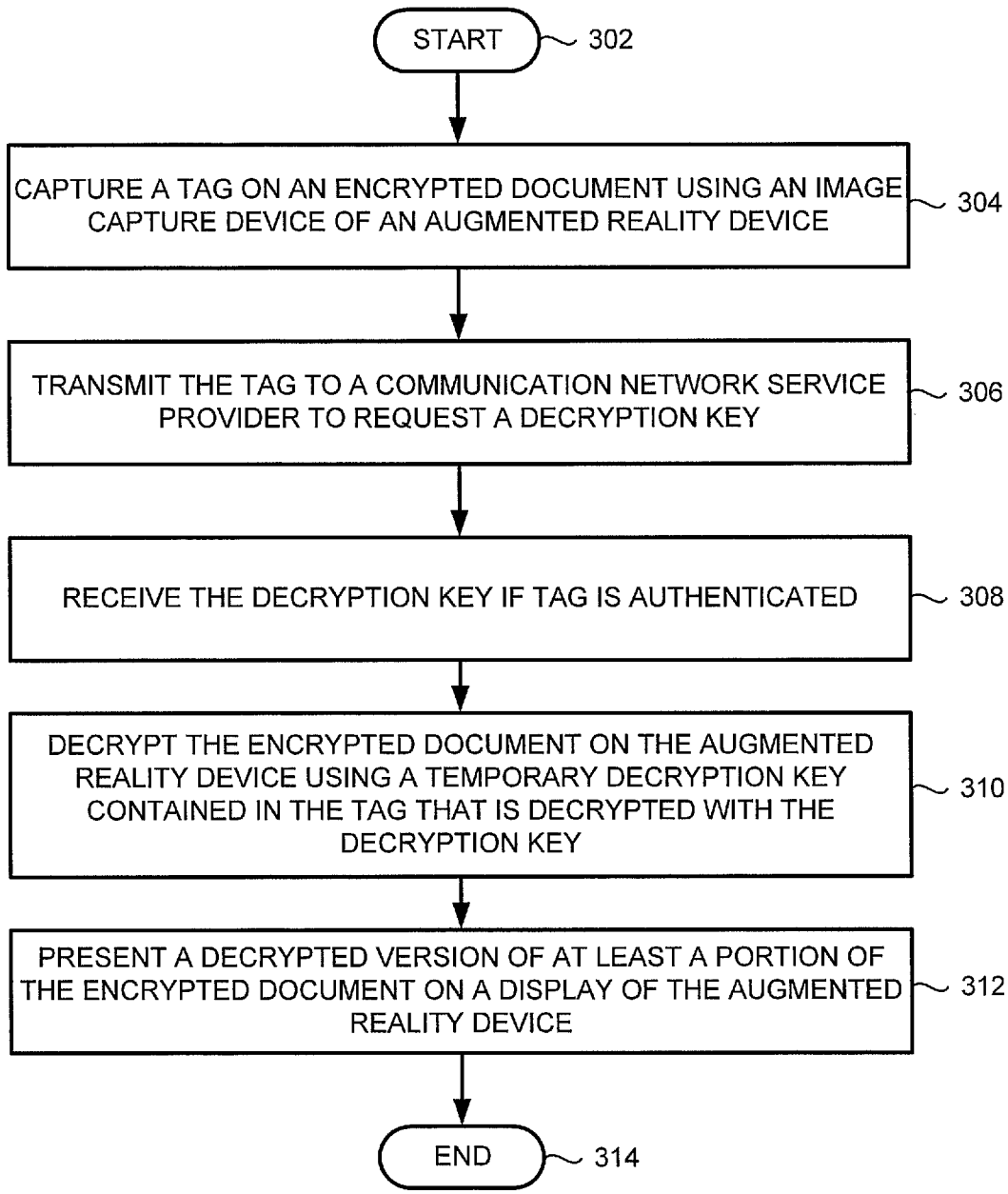
FIG. 3 illustrates an example flowchart of a second embodiment of a method for decrypting a document.

FIG. 3 illustrates an example flowchart of one embodiment of a method 300 for decrypting a document. In one embodiment, the steps, functions, or operations of the method 300 may be performed by the device 250 or a general purpose computer or computing device as described in FIG. 4 and discussed below.

The method 300 begins at step 302. At step 304, the method 300 captures a tag on an encrypted document using an image capture device of an augmented reality device. In one embodiment, the tag may include a signature, an identification of a user and a time stamp. In one embodiment, the encrypted document may be received from a third party service provider that the user of the augmented reality device is a subscriber of, e.g., a bank sending an encrypted bank statement to the user. The third party service provider may add the tag to the encrypted document (e.g., at a designated part of the document such as at one of the corners of the document) before sending the encrypted document to the augmented reality device.

In one embodiment, the encrypted document may be either a physical document, e.g., a printed document on paper, or an electronic document (or an electronic image of the document) on a display, e.g., an email, a web page, a word processing document, a spreadsheet document, and the like.

In one embodiment, the document may be encrypted as an n×m matrix of the blocks. For example, a per-document key Kdoc can be used to encrypt the matrix block by block. The per-document key may be for example, the temporary key or the short term key described above. The per-document key may be encrypted using the master public key. In one embodiment, the data at row i and column j, denoted $M_{i,j}$, may be encrypted according to a function $C_{i,j}=[i, j, F_{Kdoc}(i, j) \oplus M_{i,j}]$, where F is a block cipher, such as AES. The above encryption method may use less memory and be more efficient than other currently used methods of encryption.

In one embodiment, the augmented reality device may be any single device or a combination of devices that is capable of capturing an image, communicating over a communication network, either wirelessly or via a wired connection, implementing encryption and decryption algorithms and having a display. In one embodiment, the augmented reality device may be a mobile end point device, such as for example, a cell phone, a smart phone, a tablet, a net book, a lap top computer, and the like, or a pair of augmented reality glasses having wireless communication capability, an image capturing device and a small personal display within a lens of the glasses. In one embodiment, the augmented reality device may be a combination of devices, for example, a mobile endpoint device in communication with an image capturing device or a pair of augmented reality glasses only having a display and image capturing device, but no communications capability with a communication network.

At step 306, the method 300 transmits the tag to a communication network service provider to request a per-document decryption key. In one embodiment, the tag may be visually captured by the augmented reality device from a predefined location of the document and then sent to the communication network service provider. In one embodiment, the augmented reality device that transmits the tag and requests the per-document decryption key may be authenticated to prevent unauthorized persons from obtaining the per-document decryption key, e.g., if the augmented reality device is stolen within a time period that the per-document decryption key is available.

At step 308, the method 300 receives the per-document decryption key if the tag is authenticated. In one embodiment, the tag may be authenticated if the signature is from a legitimate third party service provider, if the ID of the user is a subscriber of the communication network service provider and the request is received within an available time window.

At step 310, the method 300 may decrypt the encrypted document on the augmented reality device using a temporary decryption key contained in the tag that is decrypted with the per-document decryption key. For example, the encrypted document displayed or produced by the device 108 may be decrypted using a temporary decryption key contained in the tag by the augmented reality device. The temporary decryption key may be obtained from the tag that is decrypted using the per-document decryption key obtained in step 308.

At step 312, the method 300 may present a decrypted version of the encrypted document on a display of the augmented reality device. In one embodiment, only a portion of the encrypted document is decrypted and displayed at any given time. For example, if the encrypted document is 8 inches by 12 inches, the image capturing device on the augmented reality device may only capture a 2 inch by 2 inch portion of the encrypted document. Thus, only a decrypted version of the 2 inch by 2 inch image that is captured would be displayed on the augmented reality device. It should be noted that the dimensions provided above are only provided as an example and that any sized document may be used and that image capturing device may capture any sized image. The method 300 ends at step 314.

It should be noted that although not explicitly specified, one or more steps, operations or blocks of the methods 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIGS. 2 and 3 that recite a determining operation, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

FIG. 4 depicts a high-level block diagram of a general-purpose computer suitable for use in performing the functions described herein. For example, any one or more components or devices illustrated in FIG. 1 or described in connection with the methods 200 and 300 may be implemented as the system 400. As depicted in FIG. 4, the system 400 comprises a hardware processor element 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for decrypting a document, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps functions and/or operations of the above disclosed methods. In one embodiment, the present module or process 405 for decrypting a document can be implemented as computer-executable instructions (e.g., a software program comprising computer-executable instructions) and loaded into memory 404 and executed by hardware processor 402 to implement the functions as discussed above. As such, the present method 405 for decrypting a document as discussed above in methods 200 and 300 (including associated data structures) of the present disclosure can be stored on a non-transitory (e.g., tangible or physical) computer readable storage medium, e.g., RAM memory, magnetic or optical drive or diskette and the like.

It should be noted that the hardware processor can be configured or programmed to cause other devices to perform one or more operations as discussed above. In other words, the hardware processor may serve the function of a central controller directing other devices to perform the one or more operations as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
registering, by an application server, with a communication network service provider of a communication network;
receiving, by the application server, a master public key and a private signature key from the communication network service provider;
receiving, by the application server, from a device of a user a request for a document;
encrypting, by the application server, the document with a temporary key to generate an encrypted document;
encrypting, by the application server, the temporary key with the master public key into a tag;
generating, by the application server, a signed tag with the private signature key and the tag; and
sending, by the application server, the encrypted document and the signed tag to the device of the user.

2. The method of claim 1, wherein the tag comprises a signature, an identification of a user and a time stamp, wherein the signature is generated using the private signature key.

3. The method of claim 1, wherein the encrypted document is visually encoded block by block using an n×m matrix.

4. The method of claim 1, wherein the master public key of a master key pair is used to generate and encrypt the temporary key that is contained in the tag and the temporary key is to be used to decrypt the encrypted document.

5. The method of claim 4, wherein a per-document decryption key is generated using a private master key of the master key pair.

6. The method of claim 1, wherein the encrypted document comprises a printed document.

7. The method of claim 1, wherein the encrypted document comprises an electronic document.

8. The method of claim 1, wherein the device comprises an augmented reality device.

9. The method of claim 8, wherein the augmented reality device comprises a mobile end point device.

10. A tangible computer-readable medium storing a plurality of instructions, which when executed by a processor of an application server, cause the processor to perform operations, the operations comprising:
registering with a communication network service provider of a communication network;
receiving a master public key and a private signature key from the communication network service provider;
receiving from a device of a user a request for a document;
encrypting the document with a temporary key to generate an encrypted document;
encrypting the temporary key with the master public key into a tag;
generating a signed tag with the private signature key and the tag; and
sending the encrypted document and the signed tag to the device of the user.

11. The tangible computer-readable medium of claim 10, wherein the tag comprises a signature, an identification of a user and a time stamp, wherein the signature is generated using the private signature key.

12. The tangible computer-readable medium of claim 10, wherein the encrypted document is visually encoded block by block using an n×m matrix.

13. The tangible computer-readable medium of claim 10, wherein the master public key of a master key pair is used to generate and encrypt the temporary key that is contained in the tag and the temporary key is to be used to decrypt the encrypted document.

14. The tangible computer-readable medium of claim 13, wherein a per-document decryption key is generated using a private master key of the master key pair.

15. The tangible computer-readable medium of claim 10, wherein the encrypted document comprises a printed document.

16. The tangible computer-readable medium of claim 10, wherein the encrypted document comprises an electronic document.

17. The tangible computer-readable medium of claim 10, wherein the device comprises an augmented reality device.

18. The tangible computer-readable medium of claim 17, wherein the augmented reality device comprises a mobile end point device.

19. An apparatus comprising:
a processor of an application server; and
a computer-readable medium storing a plurality of instructions which, when executed by the processor, cause the processor to perform operations, the operations comprising:
registering with a communication network service provider of a communication network;
receiving a master public key and a private signature key from the communication network service provider;
receiving from a device of a user a request for a document;
encrypting the document with a temporary key to generate an encrypted document;
encrypting the temporary key with the master public key into a tag;
generating a signed tag with the private signature key and the tag; and
sending the encrypted document and the signed tag to the device of the user.

20. The apparatus of claim 19, wherein the tag comprises a signature, an identification of a user and a time stamp, wherein the signature is generated using the private signature key.

* * * * *